United States Patent [19]

Ida et al.

[11] Patent Number: 4,797,665
[45] Date of Patent: Jan. 10, 1989

[54] X-Y POSITION INPUT DEVICE

[75] Inventors: Yuichi Ida; Junichi Hosogoe, both of Miyagi, Japan

[73] Assignee: Alps Electric Co., Ltd., Japan

[21] Appl. No.: 826,860

[22] Filed: Feb. 6, 1986

[30] Foreign Application Priority Data

Feb. 6, 1985 [JP] Japan .................................. 60-14653

[51] Int. Cl.[4] .............................................. G09G 1/00
[52] U.S. Cl. ..................... 340/710; 340/706
[58] Field of Search ........ 340/706, 709, 710; 178/18, 19; 74/471 X Y; 273/148 B

[56] References Cited

U.S. PATENT DOCUMENTS

| | | | |
|---|---|---|---|
| 3,835,464 | 9/1974 | Rider | 340/710 |
| 3,987,685 | 10/1976 | Opecensky | 340/710 |
| 4,369,439 | 1/1983 | Broos | 340/706 |
| 4,390,873 | 6/1983 | Kirsch | 340/710 |
| 4,464,652 | 8/1984 | Lapson et al. | 74/471 X Y |
| 4,561,183 | 12/1985 | Shores | 178/18 |
| 4,562,314 | 12/1985 | Hosogoe et al. | 340/710 |
| 4,595,070 | 6/1986 | Hodges | 340/710 |

FOREIGN PATENT DOCUMENTS

| | | | |
|---|---|---|---|
| 0146843 | 7/1985 | European Pat. Off. | 340/710 |
| 2544529 | 10/1984 | France | 340/709 |
| 0250424 | 12/1985 | Japan | 340/710 |
| 2154734 | 9/1985 | United Kingdom | 340/710 |

*Primary Examiner*—Gerald L. Brigance
*Assistant Examiner*—Mahmoud Fatahiyar
*Attorney, Agent, or Firm*—Guy W. Shoup; Paul J. Winters; Leighton K. Chong

[57] ABSTRACT

A position input device for a computer system, commonly referred to as a "mouse", has a resilient cushion attached to the bottom of its casing and a high-durability, low-friction slide sheet attached to the bottom of the cushion resulting in a device which easily slides on a desktop surface, resists wearing down, and does not generate noise when slid.

4 Claims, 2 Drawing Sheets

X-Y POSITION INPUT DEVICE

BACKGROUND OF THE INVENTION

1. Field of the Invention

This invention relates to an X-Y position input device for computer systems, commonly known as a "mouse", which operates by sliding a casing on a base such as a desk top. It has a globe projecting on the under side of the casing which rolls on the base and the extent of rolling of the globe is output in terms of X- and Y-coordinates to provide coordinate values for the location of the mouse.

2. Description of the Prior Art

An input device of this type is, because of its good operability, used to move a cursor displayed on a CRT, for example, of an office computer, to input a starting point, turn point, and end point in drawing a picture, or to designate selective items displayed on the CRT, and permits, by using jointly together with a keyboard type input device, rapid and easy inputting of various data items.

The X-Y position input device is designed so that as its casing is moved on and along the surface of a horizontal stand, dedicated sheet, etc., the globe which partially projects through an opening formed in the bottom of the casing rolls on the surface (base). Usually, several means were incorporated in the bottom of the casing to ease the sliding action of the device on the base.

Describing illustratively, according to the prior art, the casing was formed of a hardened synthetic resin of good slidability and its under face was provided with a plurality of (usually, three) small projections, or a plurality of small-diameter bearings provided on the under side of the casing a portion each of which is made to project beyond the under face of the casing. However, the former had the problems in that the small projections wore with use thus deteriorating the sliding action; and the latter, though it was superior in wear resistance because of the use of the ball bearings, it had drawbacks in that the manufacturing costs were high and mechanical noise was generated when vibration from the rotating ball bearings was transmitted to the casing body.

A further different configuration of the X-Y position input device is also proposed in which an elastic member, such as nonwoven fabric or felt, is bonded to a certain position on the bottom face of the casing. Because this elastic member serves as a sliding surface against the base, this proposed configuration can prevent generation of mechanical noise. However, as the casing slides on the base which is comparatively hard and poor in slidability because it is made of hardwood, veneer etc. the elastic member tends to be worn away by the base.

SUMMARY OF THE INVENTION

It is an object of the present invention to solve the foregoing drawbacks of the prior art, thereby to provide at a low cost an X-Y position input device which is quiet in operation and superior in durability.

To achieve the foregoing object, the present invention provides an X-Y position input device comprising a low friction member such as a slidable sheet having good wear resistance provided on the bottom face of a casing with resilient means such as a cushion member of rich elasticity interposed therebetween.

DESCRIPTION OF THE PREFERRED EMBODIMENT

Figure 1:
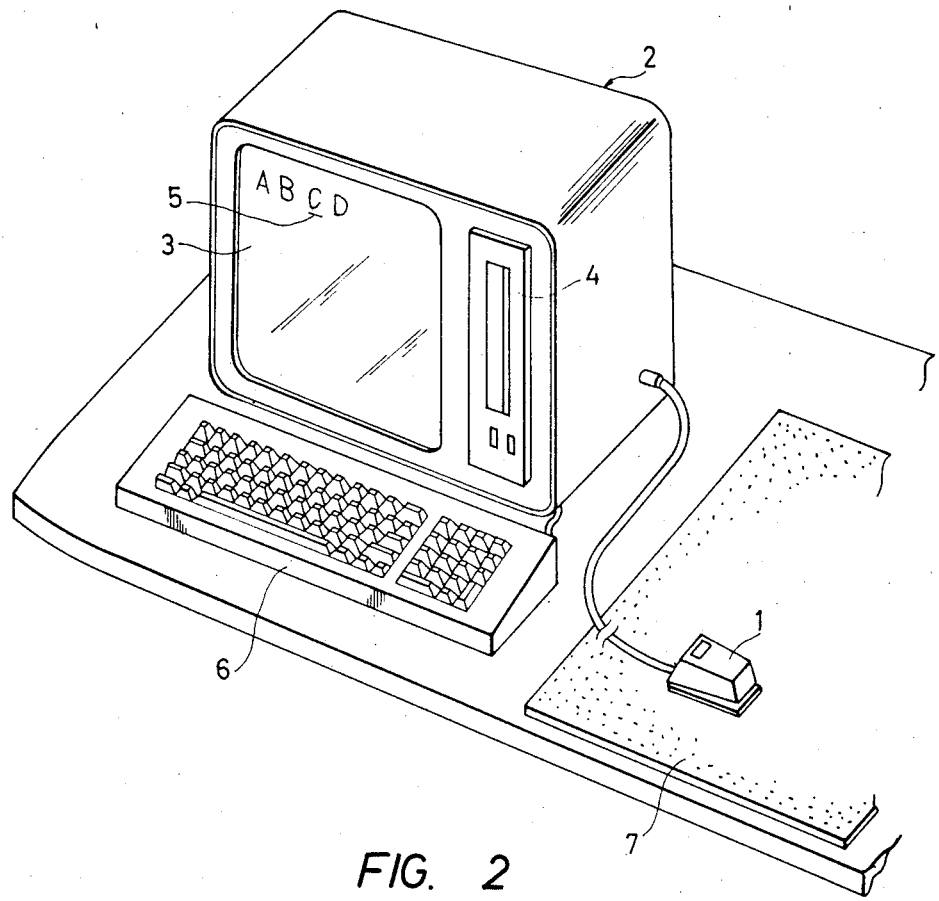
FIG. 1 is a perspective view showing the mode of use of an X-Y position input device according to the present invention.

FIGS. 1 through 5 illustrate an embodiment of the present invention. A globe rolling type X-Y position input device indicated generally by reference numeral 1 in FIG. 1 to which the present invention is applied is connected to a computer 2 equipped with a CRT display 3, floppy disk drive 4, etc. and serves to control movement of a cursor 5 on the CRT display 3. In FIG. 1, reference numeral 6 indicates a keyboard input device, and 7 indicates a dedicated sheet (base) for the globe rolling type X-Y position input device 1.

Figure 2:
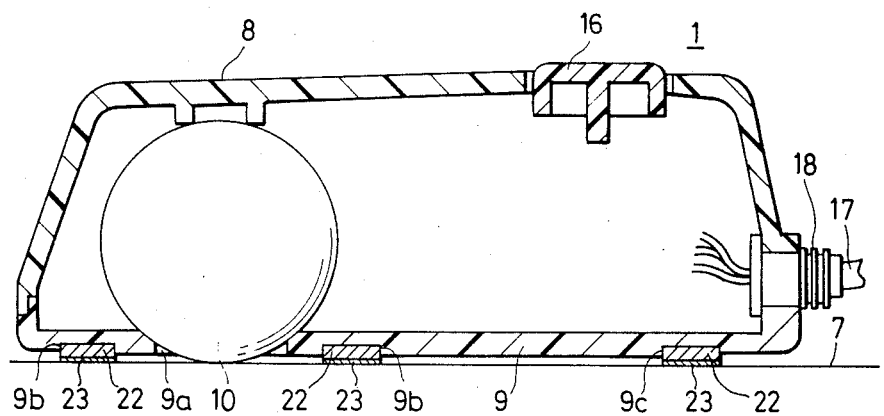
FIG. 2 is a sectional view of the X-Y position input device.
Figure 3:
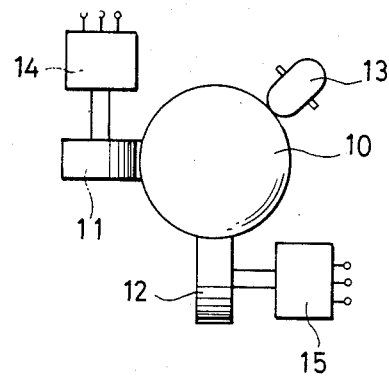
FIG. 3 is an explanation view showing the relation between a globe and driven rollers.

The X-Y position input device 1 is illustrated in FIG. 2 with some parts broken away. Inside a casing composed of an upper casing 8 and lower casing 9, a globe 10 is held rotatably, a portion of which projects outside the casing through an opening 9a of the lower casing 9. Although not shown, the casing is provided thereinside with supporting mechanism and means for detecting the rotation of the globe 10, a printed circuit board, etc. As shown in FIG. 3, the globe 10 abuts on two driven rollers 11 and 12 and supporting roller 13, to be supported at three points. The driven rollers 11 and 12 are arranged so that their axial directions intersect orthogonally, and they are coupled to rotation detecting means in the form of variable resistors 14 and 15, for example. The detecting means operate in such a manner that as the casing is moved on the sheet 7 the globe 10 rolls to turn slide segments of the variable resistors 14 and 15 via the driven rollers 11 and 12, whereby the coordinate values of the X- and Y-directions are taken out. In FIG. 2, reference numeral 16 indicates a pushbutton to control a switch equipped inside the casing, 17 indicates a cable, and 18 indicates a bushing.

Figure 4:
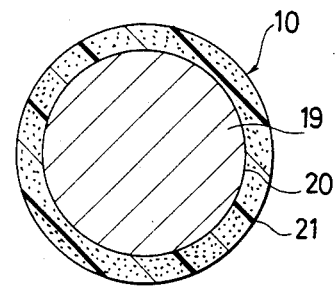
FIG. 4 is a sectional view of the globe.

As shown in FIG. 4, the inner part of the globe 10 is a metal ball 19 such as a steel ball, the surface of the metal ball 19 is covered by an adhesive layer 20, and around the adhesive layer an outer layer or sheath 21 made of a resilient material such as rubber is molded and secured thereto. The periphery of the metal ball 19 and of the sheath 21 can be smoothed easily by polishing them. Although dust tends to stick to the surface of the rubber sheath when just molded, this can be avoided by selecting a grindstone and giving a moderate degree of surface roughness to the sheath. Through this grinding work a parting line created at the time of molding is eliminated from the sheath 21 thereby resulting in a projectionless globe.

Figure 5:
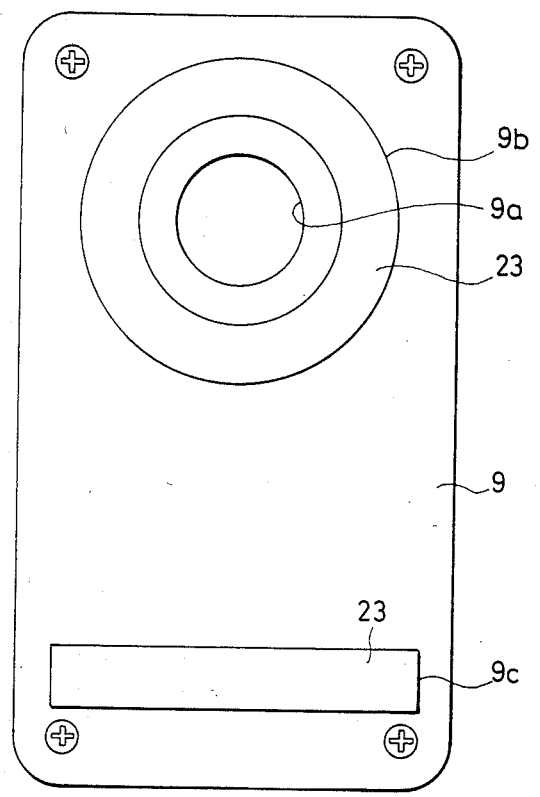
FIG. 5 is a bottom view of a lower casing.

As shown in FIGS. 2 and 5, at the, front portion of the bottom of the lower casing 9 there is formed an annular groove 9b surrounding the opening 9a and a rectangular groove 9c spaced a certain distance from the first annular groove 9b is formed at the rear portion. Inside these grooves 9b and 9c porous cushion members 22 such as sponge or plastic foam are bonded by adhesive material. Further, on the under face of each cushion member 22 a slidable sheet 23, which is a film of superior slidability made of fluorine resin such as Teflon (trade name), is bonded. The cushion member 22 and slidable sheet 23 are made into a single body by appropriate means, such as bonding or thermal welding, and as shown in FIG. 2, the slidable sheet 23 and cushion 22 are dimensioned so as to project below the bottom of the lower casing 9.

As the input device 1 is moved in a desired direction on the sheet (base) 7 while being held by hand, the globe 10 rolls on the sheet 7 due to a frictional force created by its own weight. Rotation of the globe 10 is transmitted separately to the two driven rollers 11 and 12, and the rotational angle of each of the driven rollers 11 and 12 is detected by means of the accompanied variable resistors 14 and 15, respectively. The detected signals are supplied through the cable 17 to a display controller provided inside the computer 2, and through signal processing the cursor 5 is moved to the desired position on the CRT display 3. In the foregoing operation, the bottom face of the lower casing 9 does not come to contact directly with the base sheet 7, instead the slidable sheet 23 attached to the bottom of the lower casing 9 via the cushion member 22 slides on the sheet 7, so that no noise is generated and smooth rolling and sliding are obtained. Further, because friction with the sheet 7 is reduced because of the presence of the slidable sheet 23, the force required to manipulate the input device is lightened thereby resulting in good operability.

In the illustrated embodiment, the globe 10 covered by rubber is used and thus the input device 1 comes to contact with the sheet 7 only through the elastic material of the globe and cushion the member 22, so that a very high muffling effect is obtained. Further, one slidable sheet 23 is provided around the opening 9a, so that foreign material, such as dust, moisture and oil, stuck to the sheet 7 can be prevented from adhering to the globe 10 and problems tending to arise as a result of adhesion of foreign material can be avoided.

It is to be understood that the arrangemental relationship between the cushion member 22 and the slidable sheet 23 of the present invention should not be limited to that illustrated in the foregoing embodiment. The requirement is that a low friction member such as the slidable sheet 23 be joined to resilient means such as the cushion member 22 to serve as the sliding means so that the casing can slide on the sheet 7 while noise from the base (sheet) 7 is muffled by the resilient means. Materials of the cushion member 22 and slidable sheet 23 also should not be limited to those illustrated in the embodiment and may be selected from among appropriate materials.

As is apparent from the foregoing description, according to the present invention, by the sliding action between the base and the slidable sheet provided on the bottom of the casing via the cushion member, the input device can move satisfactorily, little noise is generated in moving, and the input device can be operated by a small manipulation force, such that an X-Y position input device of superior durability can is provided at a low cost.

What is claimed is:

1. An input device movable on a base surface comprising a casing with an opening provided in one part of its bottom surface, a globe held rotatably in the casing with a portion thereof projecting through the opening to engage and roll on the base surface when the input device is moved thereon, the improvement comprising:

said bottom surface of the casing having an annular groove (9b) formed therein surrounding the opening in said one part thereof through which the globe portion projects, a cushion member bonded in said annular groove, and a slidable sheet bonded to the cushion member, and said bottom surface further having a rectangular groove (9c) formed in another part thereof spaced from said opening in said one part, a corresponding cushion member bonded in said rectangular groove, and a slidable sheet bonded to said cushion member, wherein said slidable sheets bonded to said cushion members in said annular groove and said rectangular groove project downward from the bottom surface of the cashing for making resilient, noiseless, low-friction sliding contact when said casing is moved on the base surface, and said slidable sheet bonded to said cushion member in said annular groove prevents foreign material from becoming adhered to said globe projecting through said opening.

2. The input device of claim 1 wherein the slidable sheet includes a fluorine resin.

3. The input device of claim 1 wherein the slidable sheet has a hole surrounding the opening of the casing.

4. The input device of claim 1 wherein the globe has an outer layer of rubber-like material.

* * * * *

UNITED STATES PATENT AND TRADEMARK OFFICE
CERTIFICATE OF CORRECTION

PATENT NO. : 4,797,665
DATED : January 10, 1989
INVENTOR(S) : Ida et al.

It is certified that error appears in the above-identified patent and that said Letters Patent is hereby corrected as shown below:

Col. 4, line 36, delete "cashing" and insert --casing--.

Signed and Sealed this

Fifteenth Day of August, 1989

Attest:

DONALD J. QUIGG

*Attesting Officer*        *Commissioner of Patents and Trademarks*